United States Patent
Shin

(10) Patent No.: US 10,668,515 B2
(45) Date of Patent: Jun. 2, 2020

(54) APPARATUS AND METHOD OF SIZE CORRECTION FOR HOT STAMPING COMPONENT

(71) Applicant: Kia Motors Corporation, Seoul (KR)

(72) Inventor: Gil Ho Shin, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 518 days.

(21) Appl. No.: 15/372,628

(22) Filed: Dec. 8, 2016

(65) Prior Publication Data
US 2018/0056356 A1    Mar. 1, 2018

(30) Foreign Application Priority Data

Sep. 1, 2016  (KR) .......................... 10-2016-0112726

(51) Int. Cl.
*B21D 1/14*    (2006.01)
*B21D 1/12*    (2006.01)
(Continued)

(52) U.S. Cl.
CPC .............. *B21D 1/145* (2013.01); *B21D 1/12* (2013.01); *B21D 3/10* (2013.01); *C21D 9/0025* (2013.01);
(Continued)

(58) Field of Classification Search
CPC ... B21D 1/00; B21D 1/12; B21D 1/14; B21D 1/145; B21D 3/10; B21D 3/14
(Continued)

(56) References Cited

U.S. PATENT DOCUMENTS

| 4,531,391 A * | 7/1985 | Engman .................. B21D 3/10 |
| | | 72/19.6 |
| 6,216,524 B1 * | 4/2001 | Weschler ............... B21D 1/145 |
| | | 72/305 |

(Continued)

FOREIGN PATENT DOCUMENTS

| CN | 201339046 Y | 11/2009 |
| CN | 202779297 U | 3/2013 |

(Continued)

OTHER PUBLICATIONS

Li, Translation CN203484438, 2014 (Year: 2014).*

*Primary Examiner* — Adam J Eiseman
*Assistant Examiner* — Bobby Yeonjin Kim
(74) *Attorney, Agent, or Firm* — Mintz Levin Cohn Ferris Glovsky and Popeo, P.C.; Peter F. Corless

(57) ABSTRACT

An apparatus of size correction for a hot stamping component is provided. The apparatus includes a jig frame and a plurality of attaching units disposed on the jig frame to rotate in an anteroposterior direction and support a hot stamping component including a quenched component which is partially quenched along the jig frame in the anteroposterior direction. A plurality of clamping units disposed on the jig frame and configured to clamp the hot stamping component. A plurality of measurement units mounted on the jig frame and measure a height of the quenched component based on a predetermined zero base. A plurality of correction units are mounted in front of the jig frame corresponding to the quenched component of the hot stamping component. A force is applied to the quenched component in a vertical direction based on the height size, measured by the measurement unit to adjust the height.

17 Claims, 12 Drawing Sheets

(51) Int. Cl.
    *C21D 9/00*           (2006.01)
    *B21D 3/10*           (2006.01)
    *G01B 5/06*           (2006.01)
    *B21D 22/02*         (2006.01)
    *C21D 1/18*           (2006.01)
    *C21D 8/00*           (2006.01)
(52) U.S. Cl.
    CPC ............ G01B 5/061 (2013.01); *B21D 22/022* (2013.01); *C21D 1/18* (2013.01); *C21D 8/005* (2013.01)
(58) Field of Classification Search
    USPC .................................................. 72/31.02, 705
    See application file for complete search history.

(56) References Cited

U.S. PATENT DOCUMENTS

| | | | | |
|---|---|---|---|---|
| 6,279,367 | B1* | 8/2001 | Mehara | B21D 3/10 72/203 |
| 6,408,663 | B1* | 6/2002 | Pickren | B21C 51/00 29/888.08 |
| 9,610,657 | B2* | 4/2017 | Jang | B21D 37/16 |
| 2004/0103711 | A1* | 6/2004 | McIlwraith | B21D 1/145 72/293 |
| 2014/0116105 | A1* | 5/2014 | Han | B21D 3/10 72/324 |
| 2014/0208817 | A1* | 7/2014 | Dai | B21D 1/06 72/19.7 |
| 2015/0260508 | A1* | 9/2015 | Cagle | B25H 1/0014 356/601 |

FOREIGN PATENT DOCUMENTS

| | | | | |
|---|---|---|---|---|
| CN | 203484438 | * | 3/2014 | ............. B21D 1/00 |
| CN | 103691770 A | | 4/2014 | |
| CN | 105792979 A | | 7/2016 | |
| JP | H06-179351 A | | 6/1994 | |
| KR | 10-0279093 B1 | | 10/2000 | |
| KR | 10-1046816 B1 | | 7/2011 | |
| KR | 10-1316833 B1 | | 10/2013 | |

* cited by examiner (a)             (b)

APPARATUS AND METHOD OF SIZE CORRECTION FOR HOT STAMPING COMPONENT

CROSS-REFERENCE TO RELATED APPLICATION

This application claims priority to and the benefit of Korean Patent Application No. 10-2016-0112726 filed in the Korean Intellectual Property Office on Sep. 1, 2016, the entire contents of which are incorporated herein by reference.

BACKGROUND

(a) Field of the Disclosure

The present disclosure relates to an apparatus and a method for manufacturing a hot stamping component, and more particularly, to size correction for a hot stamping component, which is used for correcting a size distribution of a locally quenched portion in the hot stamping component such as a center pillar exterior panel.

(b) Description of the Related Art

Typically, components having various strengths are used in vehicles. For example, components that absorb energy during a vehicle collision require a comparatively reduced strength and a component requiring shape maintenance requires a greater strength to secure a passenger cavity. When the components that absorb the energy have excessively large strengths during the collision, the components cannot appropriately absorb shock energy and merely transfer the shock energy to other portions of the vehicle. Accordingly, excessive shock is transferred to the passenger and other portions of the vehicle.

Weight and cost reduction of the vehicle are continuously required and as a result, components partially have different heterogeneous strengths. A partial section of the component requires a greater strength to protect the passenger, but a partial section requires a relatively small strength to absorb the shock energy. For example, the components may representatively include vehicle body components that have a center pillar and a collision member of a passenger vehicle. The center pillar of the passenger vehicle connects a floor and a roof of a vehicle body between a front door and a rear door. A lower portion of an exterior panel in the center pillar requires a relatively small tensile strength and an upper portion requires a greater tensile strength. In other words, during a vehicle collision, a component that has a shape to be maintained has a greater strength and a component where shock is required to be absorbed while being collapsed are simultaneously required.

A detailed required strength varies based on a type or a shape of the vehicle. In particular, the upper portion of the exterior panel of the center pillar requires the tensile strength of approximately 1500 MPa, while the lower portion requires the tensile strength of approximately 860 to 1000 MPa. In the related art, a method is used that forms the component by a material having the relatively smaller strength and thereafter, attaches a separate reinforced member to the component requiring the greater strength. When sections of one component require different strengths, the upper portion adopts a material having the greater strength and the lower portion adopts the material having the relatively smaller strength. A blank is formed by welding both materials and a final product is manufactured by hot-stamp molding the blank.

However, during the welding process and using heterogeneous materials, an increase of manufacturing cost by addition of a welding process. Additionally, deterioration in strength or occurrence of rupture in a welded component after hot stamping present quality concerns. The hot stamping as a process that heats a steel plate containing boron at an austenitizing temperature (900 to 950° C.) and molds the steel plate with a press and cools the steel plate contributes to reduce the weight of the vehicle body by enhancing a product strength approximately 2.5 times (e.g., about 860 MPa→1500 MPa).

Further, in recent years, a local quenching hot stamping component has been manufactured to increase absorption of collision energy. Since enhancement of the strength of the hot stamping component is caused by martensite transformation, when a cooling speed decreases by partially increasing a temperature of a mold or a component requiring ductility is hot-stamped while heating the material, the martensite transformation is suppressed and quenched. In a partial quenching method by partially increasing a mold temperature, the mold temperature is heated at 420° C. or greater due to a product required characteristic. Accordingly, a quenched component is extruded at a temperature of 420° C. When the extruded quenched component is maintained at a room temperature, twisting may occur, which causes the quenched component to excessively deviate from a requirement degree due to residual stress and thermal transformation caused due to a temperature difference between the quenched component and a martensite transformation portion.

A size distribution of the partial quenched component is generated due to post transformation based on a difference in cooling temperature. For example, when a distribution amount of the partial quenched component is greater than 1.5 mm, a flatness distribution of a door hinge surface in a side complete assembly is 0.8 mm and may negatively influence an inter-door step quality.

The above information disclosed in this section is merely for enhancement of understanding of the background of the disclosure and therefore it may contain information that does not form the prior art that is already known in this country to a person of ordinary skill in the art.

SUMMARY

The present disclosure provides an apparatus and a method of size correction for a hot stamping component, which reduces a size distribution of a partial quenched component by correcting a size of the partial quenched component in the hot stamping component.

An exemplary embodiment of the present disclosure provides an apparatus of size correction for a hot stamping component that may include a jig frame, a plurality of attaching units disposed on the jig frame and configured to be rotatable in an anteroposterior direction and supporting a hot stamping component including a quenched component which may be partially quenched along the jig frame in the anteroposterior direction, a plurality of clamping units disposed on the jig frame and configured to clamp the hot stamping component, a plurality of measurement units mounted on the jig frame and configured to measure a height size of the quenched component based on a predetermined zero base and a plurality of correction units disposed in front of the jig frame to correspond to the quenched component of the hot stamping component, and configured to apply a force to the quenched component in a vertical direction based on the height size of the quenched component, which may be measured by the measurement unit, and correcting the height size of the quenched component.

The plurality of correction units may be configured correct the height sizes of a center and both sides of the quenched components. The attaching unit may include a first attaching locator disposed in the jig frame in the anteroposterior direction and positioned to be erected in the vertical direction, a first attaching block hinge-coupled to the first attaching locator to be rotatable in the anteroposterior direction and supporting the hot stamping component and a first attaching cylinder hinge-coupled to the first attaching locator and having a front end of an operation rod hinge-coupled to the first attaching block. The attaching unit may include a pair of second attaching locators positioned to be erected in the vertical direction in the rear of the jig frame, a second attaching cylinder disposed in the second attaching locator and a second attaching block coupled to the front end of the operation rod of the second attaching cylinder.

A first reference pin inserted into the hot stamping component and determining a reference position of the hot stamping component may be disposed in the first attaching block positioned in front of the jig frame. A second reference pin inserted into the hot stamping component and determining the reference position of the hot stamping component may be disposed in the second attaching block. Attaching pads may be disposed in the first and second attaching blocks. The clamping unit may include a clamping locator disposed in the jig frame in the anteroposterior direction and positioned to be erected in the vertical direction, a clamper rotatably hinge-coupled to the clamping locator and a clamping cylinder hinge-coupled to the clamping locator and having the front end of the operation rod hinge-coupled to the clamper.

The correction unit may include a first moving bracket configured to be movable in a horizontal direction in front of the jig frame to correspond to each of both sides of the quenched component through a first driving unit, a first moving block installed in the first moving bracket configured to be movable in the vertical direction using a second driving unit, and a pair of first pressing members fixed to the first moving block with a predetermined gap and configured to apply a force to the both sides of the quenched component in the vertical direction.

The correction unit may include a second moving bracket configured to be movable in the anteroposterior direction in front of the jig frame using a third driving unit to correspond to the center of the quenched component, a second moving block disposed in the second moving bracket configured to be movable in the vertical direction using a fourth driving unit, and a pair of second pressing members fixed to the second moving block with a predetermined gap and configured to apply a force to the center of the quenched component in the vertical direction.

An original point setting block setting the zero base of the measurement unit may be detachably disposed in the first and second moving blocks. Any one of the one pair of first pressing members may be provided in a right angled shape (e.g., "┐" shape) and may be configured to apply a force to the tops of the sides of the quenched component. The other one of the one pair of first pressing members may be provided in an "L" shape and may be configured to apply force to the bottoms of the sides of the quenched component.

The one pair of second pressing members may be provided in a trapezoidal shape in which a long side contacts the top and the bottom to apply force to the top and the bottom of the center of the quenched component. The measurement unit may include a variation sensor fixedly disposed in the first and second moving brackets through a fixation bracket. A check block may be positioned to correspond to the zero base in front of the jig frame.

Another exemplary embodiment of the present disclosure provides an apparatus of size correction for a hot stamping component that may include a jig frame, a plurality of attaching units disposed in the jig frame and supporting a hot stamping component including a quenched component which may be partially quenched, a plurality of clamping units disposed on the jig frame and configured to clamp the hot stamping component, a plurality of measurement units mounted on the jig frame and configured to measure a height size of the quenched component based on a predetermined zero base, a plurality of correction units disposed in the jig frame to correspond to the quenched component of the hot stamping component, and configured to apply a force to press the quenched component in a vertical direction, and correcting the height size of the quenched component and a controller configured to compare and analyze the height size of the quenched component, measured by the measurement unit and a reference value of a zero base reference to apply a control signal to the correction unit.

The measurement unit may include a variation sensor disposed in the correction unit. An original point setting block setting the zero base of the measurement unit may be detachably disposed in the correction unit. The apparatus may further include an indicator configured to provide measurement data before and after correcting the quenched component and whether the size of the quenched component based on the measurement data is defective.

In another exemplary embodiment, the present disclosure provides a method of size correction for a hot stamping component using the apparatus of size correction for a hot stamping component that may include mounting an original point setting block on a correction unit and setting a zero base of a measurement unit, removing the original point setting block from the correction unit, loading a hot stamping component to an attaching unit on a jig frame, and clamping the hot stamping component through a clamping unit, measuring a height size of the quenched component through the measurement unit based on the zero base, and (operating the correction unit by comparing and analyzing the height size of the quenched component, measured by the measurement unit and a reference value of a zero base reference.

The height sizes of the quenched component, measured by the measurement unit may be compared with the reference value of the zero base reference and in response to determining that the height size of the quenched component is less than or equal to or greater than the reference value, the quenched component may be configured to apply a force in an upward or downward direction by applying a control signal to the correction unit. Measuring a height size of the quenched component may be repeated after operating the correction unit by comparing and analyzing the height size of the quench. The height sizes of a center and both sides of the quenched component may be corrected by the correction unit. Measurement data before and after correcting the height size of the quenched component and whether the size of the quenched component based on the measurement data is defective may be indicated through an indicator. After operating the correction unit by comparing and analyzing the height size of the quench, the height size of the quenched component may be measured by a dial gauge.

According to exemplary embodiments of the present disclosure, a height size of a quenched component may be measured in a hot stamping component and since a size of the quenched component may be corrected to a height size range set according to the height size, a size distribution of the quenched component for the hot stamping component may be reduced. Accordingly, in the exemplary embodiment of the present disclosure, a flatness distribution of a door hinge surface may be minimized in a side complete assembly to reduce a poor inter-door step quality and achieve cost reduction based on a decrease in defect rate.

Furthermore, in the exemplary embodiment of the present disclosure, since the size of the quenched component is actually measured through a check block and the size of the quenched component can be dually checked in addition to correction of the quenched component through a correction unit, size precision of the quenched component can be further improved.

BRIEF DESCRIPTION OF THE DRAWINGS

The drawings are used for reference in describing exemplary embodiments of the present disclosure and thus, the technical spirit of the present disclosure should not be analyzed to be limited to the accompanying drawings.

DESCRIPTION OF SYMBOLS

Figure 1:
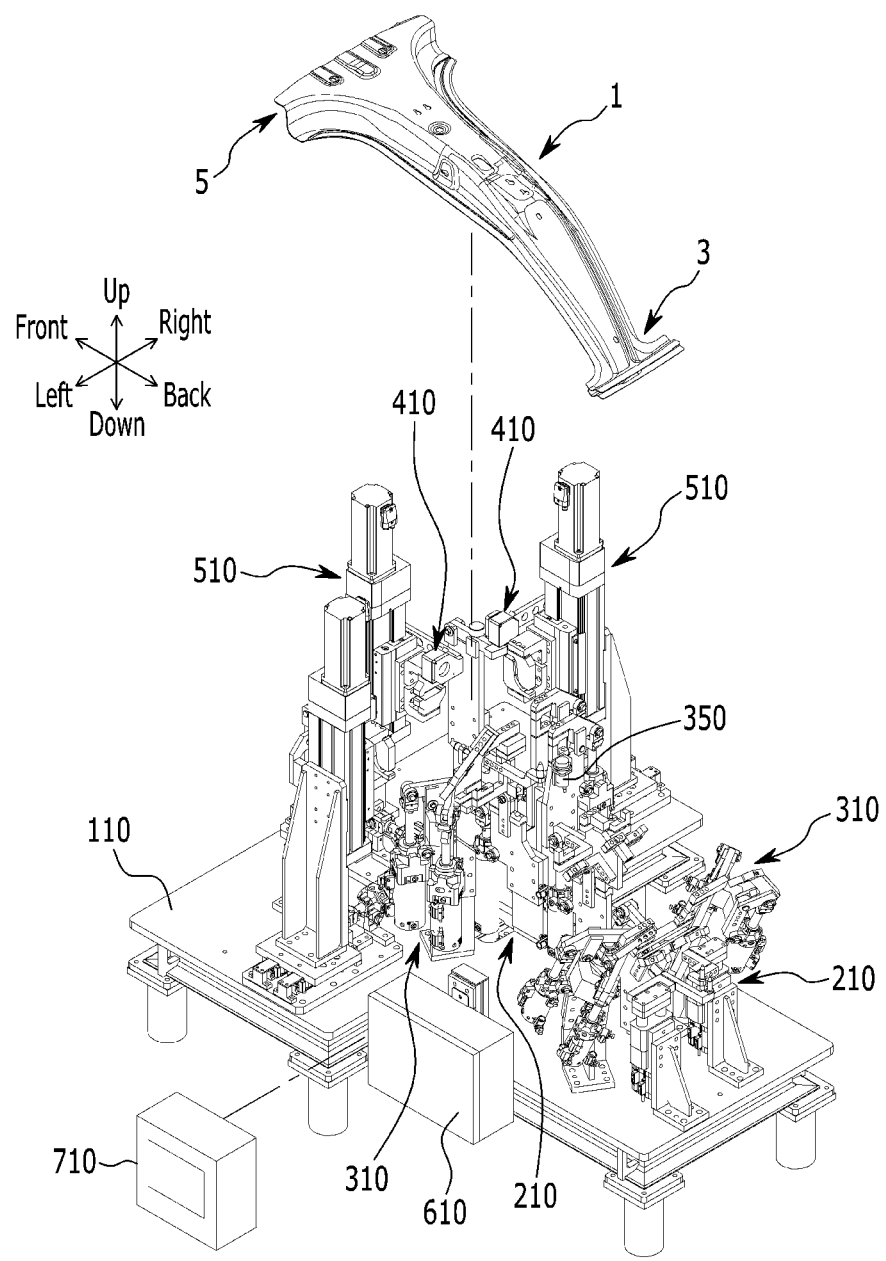
FIG. 1 is an exemplary perspective view illustrating an apparatus of size correction for a hot stamping component according to an exemplary embodiment of the present disclosure.

1 . . . Hot stamping component
3 . . . High-strength portion
5 . . . Quenched component
6a . . . Center
6b, 6c . . . Both sides
7 . . . Transition section
9 . . . Reference aperture
110 . . . Jig frame
150 . . . Check block
210 . . . Attaching unit
211 . . . First attaching locator
213 . . . First attaching block
215 . . . First attaching cylinder
217, 237, 317, 539, 589 . . . Operation rod
231 . . . Second attaching locator
233 . . . Second attaching cylinder
235 . . . Second attaching block
251 . . . Attaching pad
271 . . . First reference pin
273 . . . Second reference pin
310 . . . Clamping unit
311 . . . Clamping locator
313 . . . Clamper
315 . . . Clamping cylinder
350 . . . Sensor
410 . . . Measurement unit
411 . . . Fixation bracket
413 . . . Variation sensor
510 . . . Correction unit
511 . . . First moving bracket
513 . . . First moving block
515 . . . First pressing member
521 . . . First mounting bracket
531 . . . First driving unit
533 . . . First rail member
535 . . . First slider
537 . . . First operation cylinder
541, 561 . . . Original point setting block
551 . . . Second driving unit
553 . . . First servo motor
555 . . . First guide structure
571 . . . Second moving bracket
573 . . . Second moving block
575 . . . Second pressing member
581 . . . Third driving unit
583 . . . Second rail member
585 . . . Second slider
587 . . . Second operation cylinder
591 . . . Fourth driving unit
593 . . . Second servo motor
595 . . . Second guide structure
599 . . . Second mounting bracket
610 . . . Controller
710 . . . Indicator

DETAILED DESCRIPTION

The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure. The drawings and description are to be regarded as illustrative in nature and not restrictive and like reference numerals designate like elements throughout the specification. Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In addition, in the following detailed description, names of components, which are in the same relationship, are divided into "the first", "the second", and the like to distinguish the components, but the present disclosure is not limited to the order. Throughout the specification, unless explicitly described to the contrary, the word "comprise" and variations such as "comprises" or "comprising", will be understood to imply the inclusion of stated elements but not the exclusion of any other elements. In addition, "unit", "means", "part", "member", or the like, which is described in the specification, means a unit of a comprehensive configuration that performs at least one function or operation.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary perspective view illustrating an apparatus of size correction for a hot stamping component according to an exemplary embodiment of the present disclosure. Referring to FIG. 1, the apparatus 100 of size correction for a hot stamping component according to the exemplary embodiment of the present disclosure may be applied to a system for manufacturing the hot stamping component, which manufactures vehicle body components of collision members that may include a center pillar, a roof rail, a bumper, an impact beam, and the like by a hot stamping technology. For example, the hot stamping component 1 may include a center pillar exterior panel in which partial shapes having a super high strength and a low strength are processed by heating and rapidly cooling an original material of high tensile steel such as boron steel in a predetermined section.

The system for manufacturing a hot stamping component may include heating a blank of a boron steel plate to a first set temperature range to be phase-transformed to a full austenite metal structure in a heating furnace and cooling the blank to a second set temperature range to be phase-transformed to a metal structure in which austenite and ferrite metal structures partially exist in the blank. In addition, the manufacturing system may include molding the blank with a desired shape using a hot stamping mold and rapidly cooling the blank to a third set temperature range to cause the austenite metal structure of a molding product to be phase-transformed to the martensite metal structure using the cooling in the hot stomping mold.

Figure 2:
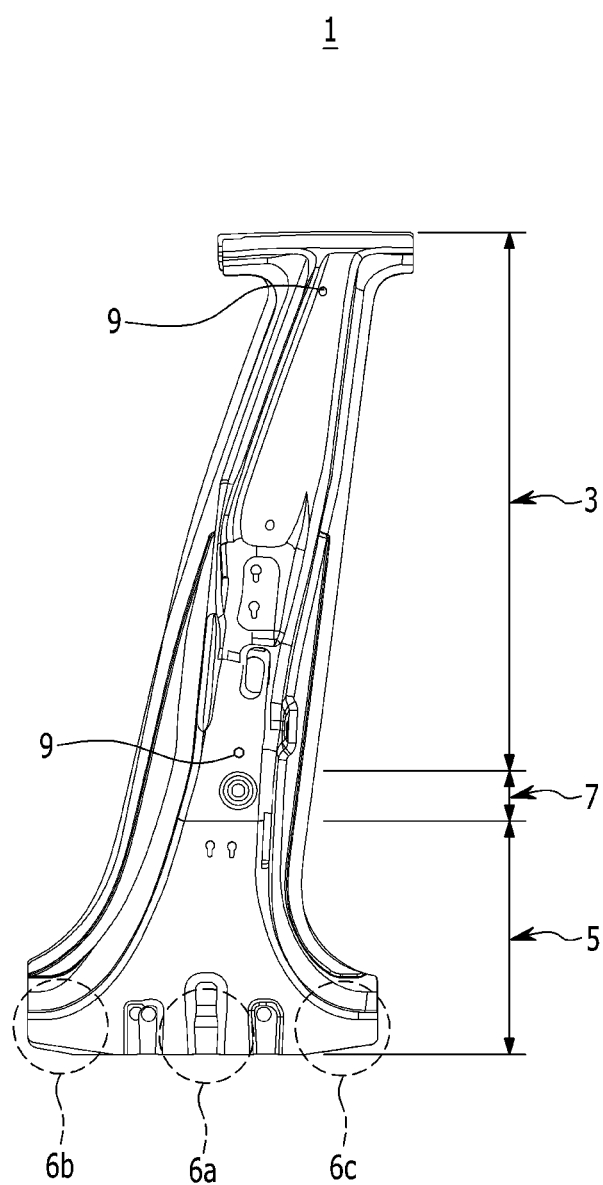
FIG. 2 is an exemplary diagram illustrating the hot stamping component applied to the apparatus of size correction for a hot stamping component according to the exemplary embodiment of the present disclosure.

The molding product hot-stamping molded may be trimming or piercing-processed by a laser in a trimming or piercing process and manufactured as the center pillar exterior panel as the hot stamping component 1. The hot stamping component 1 may form a quenched component 5 as a low-strength portion in a component when the blank is cooled to a second set temperature range as illustrated in FIG. 2. When additionally described, the hot stamping component 1 may include a high-strength component 3, the quenched component 5, and a transition section 7 formed on a boundary therebetween. In addition, at least one reference aperture 9 for taking a reference position may be formed in the hot stamping component 1.

The high-strength component 3 as a portion bonded to a roof side of a vehicle body is a component that protects a passenger during a vehicle collision or roll-over. The quenched component 5 as a portion bonded to a lower portion of the vehicle body may be a component that absorbs shock when the vehicle collides or is overturned and the transition section 7 as a portion where a strength is change between the high-strength portion 3 and the quenched component 5 may be formed during a heat-treatment process. For example, a tensile strength of the high-strength portion 3 may be about 1500 MPa or greater, the tensile strength of the quenched component 5 may be included in about 860 to 1000 MPa, and the tensile strength of the transition section 7 may be about 1000 MPa or greater. Hereinafter, the quenched component 5 will be divided into a center 6a and sides 6b and 6c at both sides of the center 6a.

The apparatus 100 of size correction for a hot stamping component according to the exemplary embodiment of the present disclosure may be applied to a size correction process after the laser trimming or piercing process in the hot stamping component manufacturing system. The size correction apparatus 100 may be used for correcting the size distribution generated due to twisting of the quenched component 5 while a heated portion of the blank is slowly cooled at a room temperature during the hot stamping molding process. The size distribution of the quenched component 5 may be defined as a case where height sizes of the center 6a and both sides 6b and 6c of the quenched component 5 deviate from a predetermined range based on a predetermined base.

The apparatus 100 of size correction for a hot stamping component according to the exemplary embodiment of the present disclosure may include a jig frame 110, an attaching unit 210, a clamping unit 310, a measurement unit 410, a correction unit 510, a controller 610, and an indicator 710. The various components may be configured in the jig frame 110, and as a result, the jig frame 110 which supports the components may be configured by one frame or two or more partitioned frames. The jig frame 110 may include various accessory components including a bracket, a bar, a rod, a plate, a housing, a case, a block, a partition, a rib, a rail, a collar, and the like for supporting the components.

However, since the various accessory components are used for installing respective components to be described below in the jig frame 110, the accessory components are collectively called the jig frame 110 except for an exceptional case in the exemplary embodiment of the present disclosure. Hereinafter, the following components will be described based on when the hot stamping component 1 is disposed in an anteroposterior direction in the jig frame 110 and it will be, as an example, described that the quenched component 5 of the hot stamping component 1 is positioned in front of the jig frame 110 and the high-strength component 3 is positioned in the rear of the jig frame 110. Definition of the direction is a relative meaning and since the direction may vary according to the reference position of the apparatus 100 and a loading direction of the hot stamping component 1, the reference direction is not particularly limited to the reference direction of the exemplary embodiment.

Figure 3:
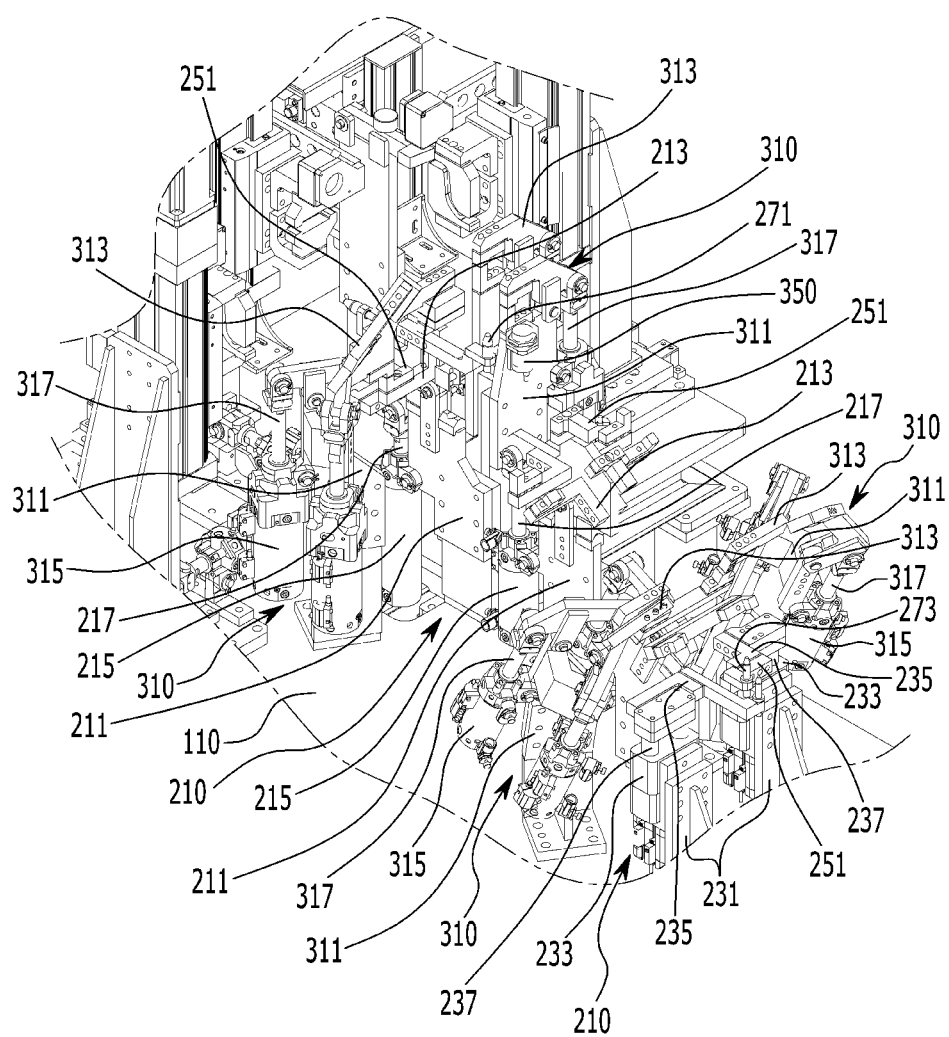
FIGS. 3 and 4 are exemplary diagrams illustrating an attaching unit and a clamping unit applied to the apparatus of size correction for a hot stamping component according to the exemplary embodiment of the present disclosure.
Figure 4:
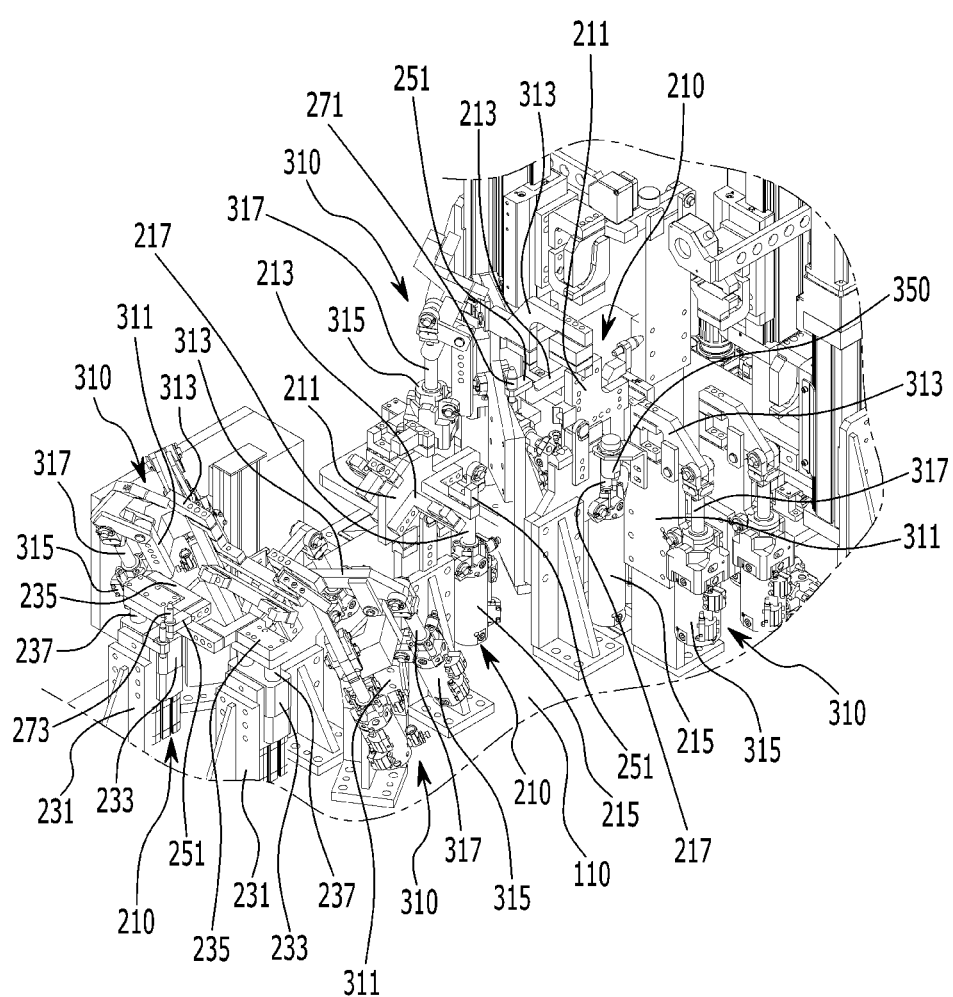

FIGS. 3 and 4 are exemplary diagrams illustrating an attaching unit and a clamping unit applied to the apparatus of size correction for a hot stamping component according to the exemplary embodiment of the present disclosure. Referring to FIGS. 3 and 4 together with FIGS. 1 and 2, in the exemplary embodiment of the present disclosure, the attaching unit 210 may be used for supporting the hot stamping component 1 on the jig frame 110 in the anteroposterior direction. Furthermore, the attaching unit 210 may be configured to adjust a seating position of the hot stamping component 1 to seat the hot stamping component 1 having a shape and a size which vary according to a vehicle type on the jig frame 110.

In particular, a plurality of attaching units 210 may be installed on the jig frame 110 and may be configured to vertically adjust and rotate in the anteroposterior direction. The attaching unit 210 may include a first attaching locator 211, a first attaching block 213, and a first attaching cylinder 215. The first attaching locator 211, the first attaching block 213, and the first attaching cylinder 215 may be disposed at residual parts other than a rear side of the jig frame 110 based on the anteroposterior direction of the jig frame 110.

The first attaching locator 211 may be disposed on the jig frame 110 in the anteroposterior direction and may be positioned to be erected in a vertical direction. The first attaching block 213 which substantially supports the hot stamping component 1 may be rotatably hinge-coupled to the first attaching locator 211 in the anteroposterior direction. The first attaching cylinder 215 may be provided as, for example, an air cylinder. The first attaching cylinder 215 may be hinge-coupled to one side of the first attaching locator 211 and a front end of an operation rod 217 may be hinge-coupled to one side of the first attaching block 213.

For example, the first attaching block 213 may be configured to rotate in the anteroposterior direction with respect to the first attaching locator 211 as the operation rod 217 moves forward and backward by operating the first attaching cylinder 215 and adjust a seating position of the hot stamping component 1 of which the shape and the size may vary based on the vehicle type. In addition, the attaching unit 210 may be disposed in the rear of the jig frame 110, and as a result, the attaching unit 210 may include a pair of second attaching locators 231, second attaching cylinders 233, and second attaching blocks 235.

The second attaching locator 231 may be positioned to be erected in the vertical direction in the rear of the jig frame 110. The second attaching cylinder 233 may be provided as, for example, the air cylinder. The second attaching cylinder 233 may include an operation rod 237 configured to move up and down in the vertical direction and disposed in the second attaching locator 231. The second attaching block 235 which supports the rear side of the hot stamping component 2 may be coupled to the front end of the operation rod 237 of the second attaching cylinder 233. For example, the second attaching block 235 may be configured to move in the vertical direction with respect to the second attaching locator 231 as the operation rod 237 may be configured to move in the vertical direction by operating the second attaching cylinder 233 and adjust the seating position of the hot stamping component 1 of which the shape and the size may vary based on the vehicle type. Meanwhile, an attaching pad 251 formed from rubber which supports the bottom of the hot stamping component 1 may be installed in the first attaching block 213 and the second attaching block 235.

Furthermore, a first reference pin 271 inserted into a reference aperture 9 in front of the hot stamping component 1 and determining the reference position of the hot stamping component 1 may be disposed in the first attaching block 213 positioned in front of the jig frame 110. In addition, a second reference pin 273 inserted into the reference aperture 9 in the rear of the hot stamping component 1 and determining the reference position of the hot stamping component 1 may be disposed in the second attaching block 235.

In the exemplary embodiment of the present disclosure, the clamping unit 310 configured to clamp the top and an edge of the hot stamping component 1 seated on the attaching unit 210 and may be disposed in plural and installed on the jig frame 110 in the anteroposterior direction. The clamping unit 310 may include a clamping locator 311, a clamper 313, and a clamping cylinder 315. The clamping locator 311 may be disposed in the jig frame 110 in the anteroposterior direction and positioned to be erected in the vertical direction. The clamper 313 which regulates the top and the edge of the hot stamping component 1 may be rotatably hinge-coupled to the clamping locator 311. The clamping cylinder 315 may be provided as, for example, the air cylinder. The clamping cylinder 315 may be hinge-coupled to one side of the clamping locator 311 and the front end of the operation rod 317 may be hinge-coupled to one side of the clamper 313.

Additionally, the plurality of clamping units 310 may be mounted with a dedicated clamper 313 for each vehicle type to clamp the hot stamping component 1 of which the shape and the size may vary based on the vehicle type. For example, some clamping units 310 may operate with respect to the hot stamping component 1 of any one vehicle type among the plurality of clamping units 310 and other clamping units 310 may operate with respect to the hot stamping component 1 of another vehicle type. Meanwhile, a sensor 350 may be configured to sense the hot stamping component 1 seated on the attaching unit 210 may be disposed in the clamping locator 311 of the clamping unit 310 disposed in front of the jig frame 110 among the clamping units 310. In other words, the sensor 350 may be configured to sense whether the hot stamping component 1 is seated on the attaching unit 210 and outputs a sensed signal to the controller 610 to be described below.

Figure 5:
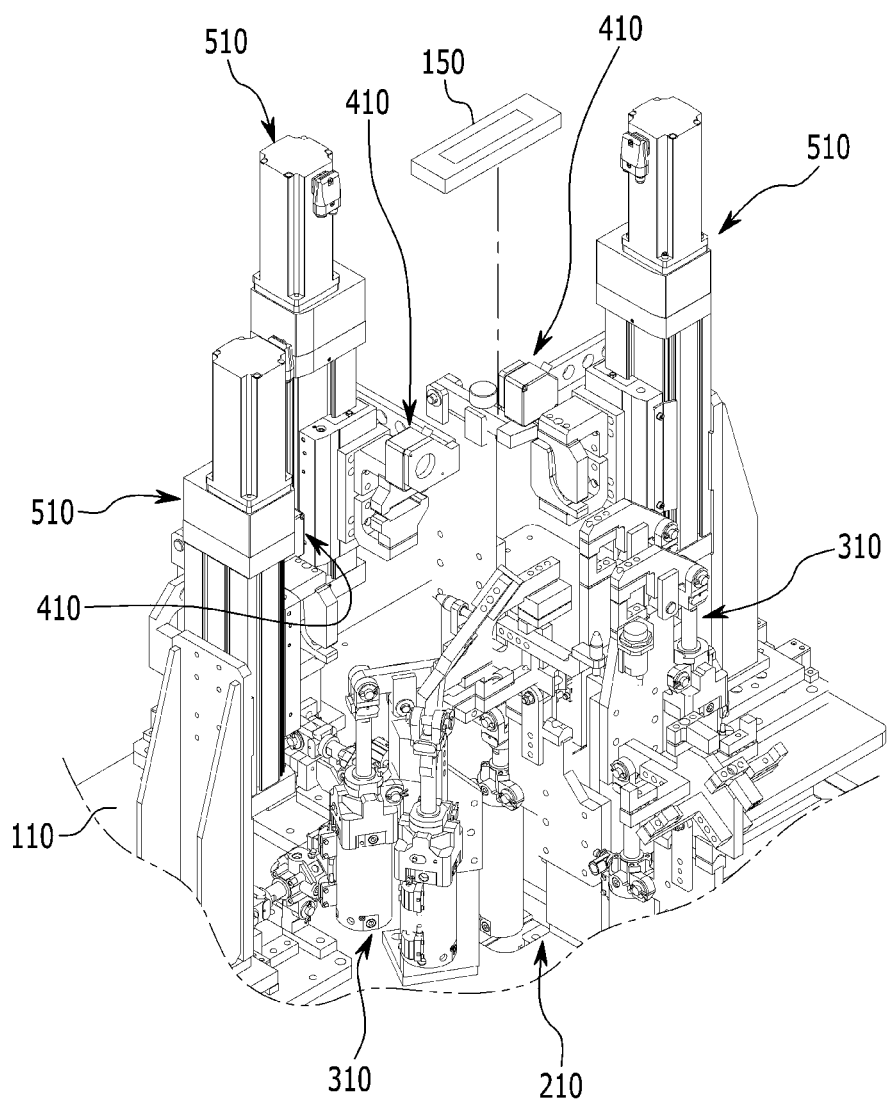
FIG. 5 is an exemplary diagram illustrating a measurement unit and a correction unit applied to the apparatus of size correction for a hot stamping component according to the exemplary embodiment of the present disclosure.

FIG. 5 is an exemplary diagram illustrating a measurement unit and a correction unit applied to the apparatus of size correction for a hot stamping component according to the exemplary embodiment of the present disclosure. Referring to FIG. 5 together with FIGS. 1 and 2, in the exemplary embodiment of the present disclosure, the measurement unit 410 may be configured to measure the height size of the quenched component 5 based on a zero base (original point) set on the jig frame 110. The measurement unit 410 may be mounted on the jig frame 110. The measurement unit 410 may be mounted on the correction unit 510 to be described below and a mounting structure of the measurement unit 410 will be described below in more detail.

In the exemplary embodiment of the present disclosure, the correction unit 510 may be used to apply a force to the quenched component 5 in the vertical direction based on the height size of the quenched component 5 measured by the measurement unit 410 and correcting the height size of the quenched component 5. The correction unit 510 may be configured to correct the height size of the quenched component 5 when the hot stamping component 1 is seated on the attaching unit 210 and clamped by the clamping unit 310. The correction unit 510 may be disposed in front of the jig frame 110 to correspond to the quenched component 5 of the hot stamping component 1. In other words, the correction unit 510 may correct the height sizes of the center 6a and both sides 6b and 6c of the quenched component 5 in front of the jig frame 110.

Figure 6:
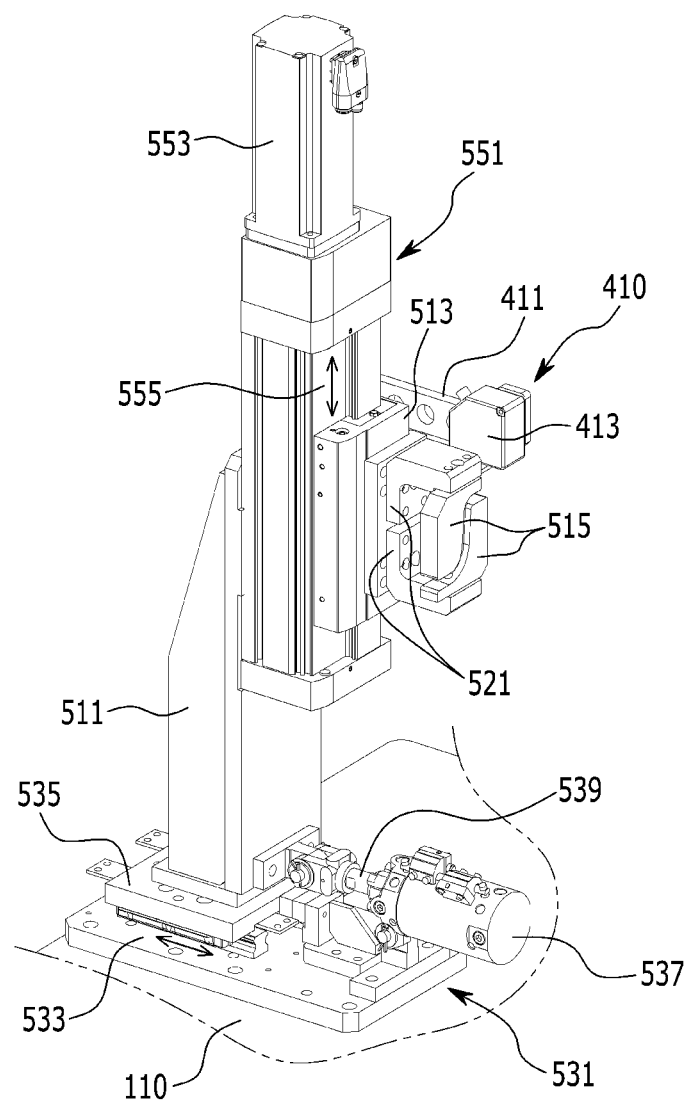
FIGS. 6 and 7 are exemplary diagrams illustrating a correction unit at a lateral quenched component center side at both sides of a quenched component applied to the apparatus of size correction for a hot stamping component according to the exemplary embodiment of the present disclosure.
Figure 7:
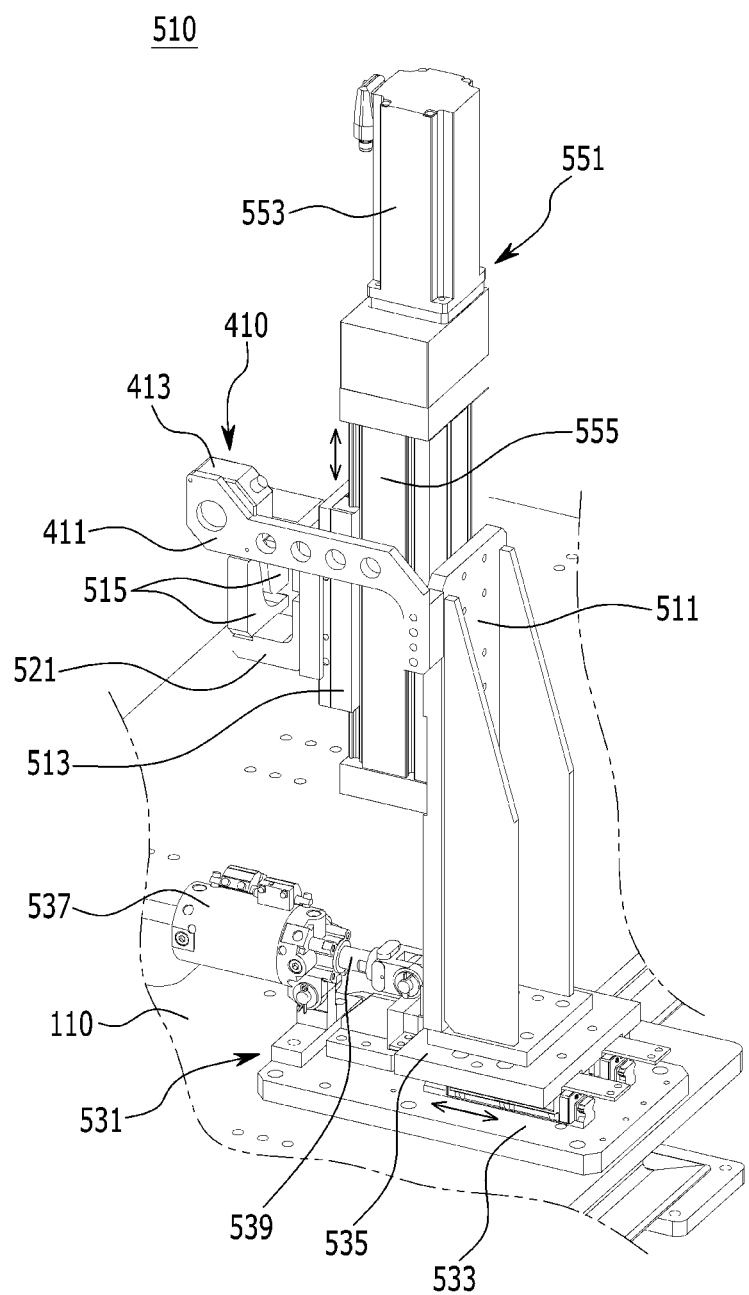

The correction unit 510 may be disposed to correspond to each of both sides 6b and 6c of the quenched component 5 in front of the jig frame 110 and installed to correspond to the center 6a of the quenched component 5. The correction unit 510 may be disposed to correspond to each of both sides 6b and 6c of the quenched component 5 and may include a first moving bracket 511, a first moving block 513, and a pair of first pressing members 515 as illustrated in FIGS. 6 and 7. The first moving bracket 511 may be configured to move in a horizontal direction by a first driving unit 531 in front of the jig frame 110 to correspond to each of both sides 6b and 6c of the quenched component 5.

The first moving bracket 511 may be disposed to be connected with the first driving unit 531 and positioned to be erected in the vertical direction. The first driving unit 531 may include a first rail member 533 disposed in the jig frame 110, a first slider 535 coupled to the first rail member 533 to reciprocate in the horizontal direction, and a first operation cylinder 537 connected with the first slider 535. The first moving bracket 511 may be coupled onto the top of the first slider 535 to be erected in the vertical direction. The first operation cylinder 537 may include an operation rod 539 configured to move forward and backward in the horizontal direction. The operation rod 539 of the first operation cylinder 537 may be connected with the first cylinder 535.

The first moving block 513 may be disposed in the first moving bracket 511 and configured to move in the vertical direction by a second driving unit 551. The first moving block 513 may be connected with the second driving unit 551. The second driving unit 551 may be fixed to the first moving bracket 511 in the vertical direction. The second driving unit 551 may include a first guide structure 555 of prior art having a lead (alternatively, ball) screw and a guide rail which converts rotary force of a first servo motor 553 into a linear motion. The first moving block 513 may be coupled to the first guide structure 555 to slidably move in the vertical direction.

In addition, the one pair of first pressing members 515 configured to apply a force to both sides 6b and 6c of the quenched component 5 in the vertical direction may be fixed to the first moving block 513 by a first mounting bracket 521. The one pair of first pressing members 515 may be fixed to the first mounting bracket 521 at a predetermined gap. Any one of the one pair of first pressing members 515 may be provided in a right angle shape (e.g., "¬" shape) to support/press the tops of the sides 6b and 6c of the quenched component 5 and the other one of the pair is provided in an "L" shape to support/press the bottoms of the sides 6b and 6c of the quenched component 5.

Figure 8:
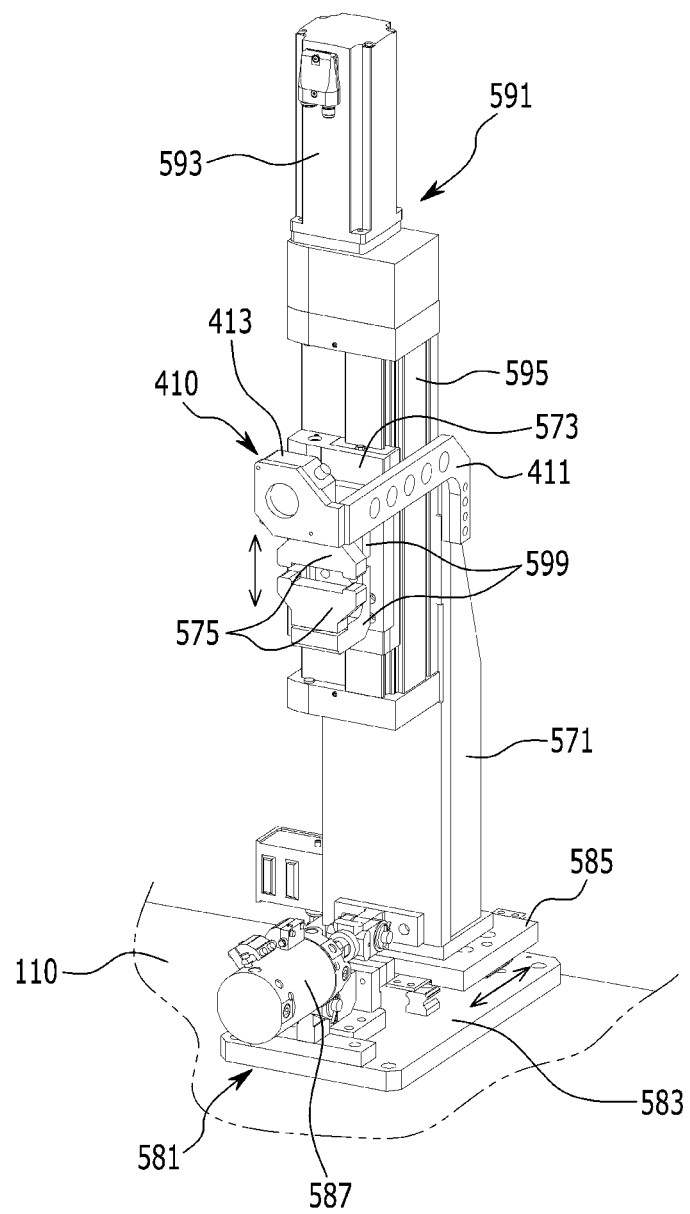
FIGS. 8 and 9 are exemplary diagrams illustrating the correction unit at the quenched component center side applied to the apparatus of size correction for a hot stamping component according to the exemplary embodiment of the present disclosure.
Figure 9:
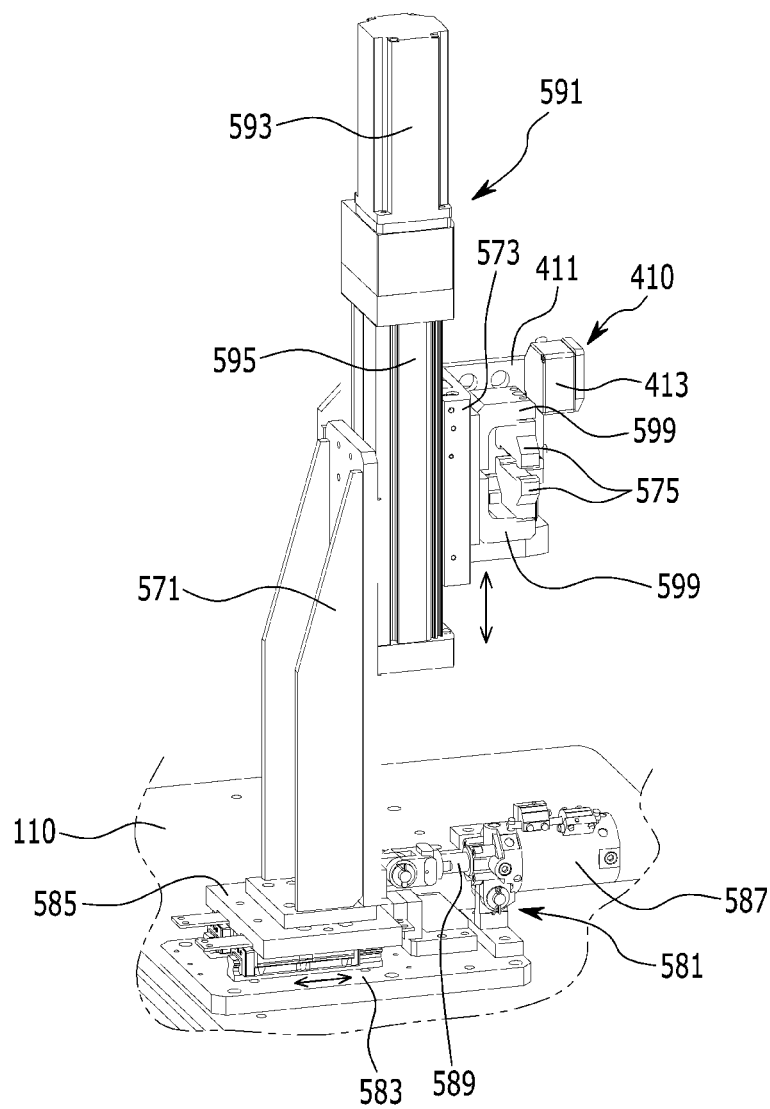

Meanwhile, the correction unit 510 may be disposed to correspond to the center 6a of the quenched component 5 and may include a second moving bracket 571, a second moving block 573, and a pair of second pressing members 575 as illustrated in FIGS. 8 and 9. The second moving bracket 571 may be configured to move in the anteroposterior direction by a third driving unit 581 in front of the jig frame 110 to correspond to the center 6a of the quenched component 5.

The second moving bracket 571 may be connected with the third driving unit 581 and positioned to be erected in the vertical direction. The third driving unit 581 may include a second rail member 583 disposed in the jig frame 110, a second slider 585 coupled to the second rail member 585 to reciprocate in the anteroposterior direction, and a second operation cylinder 587 connected with the second slider 585. The second moving bracket 571 may be coupled onto the top of the second slider 585 to be erected in the vertical direction. The second operation cylinder 587 may include an operation rod 589 which moves forward and backward in the anteroposterior direction. The operation rod 589 of the second operation cylinder 587 may be connected with the second cylinder 585.

The second moving block 573 disposed in the second moving bracket 571 may be configured to move in the vertical direction by a fourth driving unit 591. The second moving block 573 may be connected with the fourth driving unit 591. The fourth driving unit 591 may be fixed to the second moving bracket 571 in the vertical direction. The fourth driving unit 591 may include a second guide structure 595 of the prior art having the lead (alternatively, ball) screw or guide rail which converts the rotary force of a second servo motor 593 into the linear motion. The second moving block 573 may be coupled to the second guide structure 595 to slidably move in the vertical direction.

In addition, the one pair of second pressing members 575 which presses the center 6a of the quenched component 5 in the vertical direction may be fixed to the second moving block 573 by a second mounting bracket 599. The one pair of second pressing members 575 may be fixed to the second mounting bracket 599 at a predetermined gap. The one pair of second pressing members 575 may be formed in a trapezoidal shape in which long sides contact the top and the bottom of the center 6a so as to support or press the top and the bottom of the center 6a of the quenched component 5.

The measurement unit 410 according to the exemplary embodiment of the present disclosure mentioned above may be fixed to the first and second moving brackets 511 and 571 of the correction unit 510 by the fixation bracket 411. The fixation bracket 411 may be coupled to the first moving bracket 511 toward both sides 6b and 6c of the quenched component 5 and coupled to the second moving bracket 571 toward the center 6a of the quenched component 5. The measurement unit 410 may include a variation sensor 413 may be configured to measure the height sizes of the center 6a and both sides 6b and 6c of the quenched component 5 of the hot stamping component 1 based on the set zero base (original point).

The variation sensor 413 may be fixed to the front end of the fixation bracket 411 toward the center 6a and both sides 6b and 6c of the quenched component 5. Since the variation sensor 413 is configured by a variation sensor of the prior art, configured to sense a variation (distance) from a sensed object and output a sensed signal to the controller 610 to be described below, more detailed description thereof will be omitted in the present disclosure.

Figure 10:
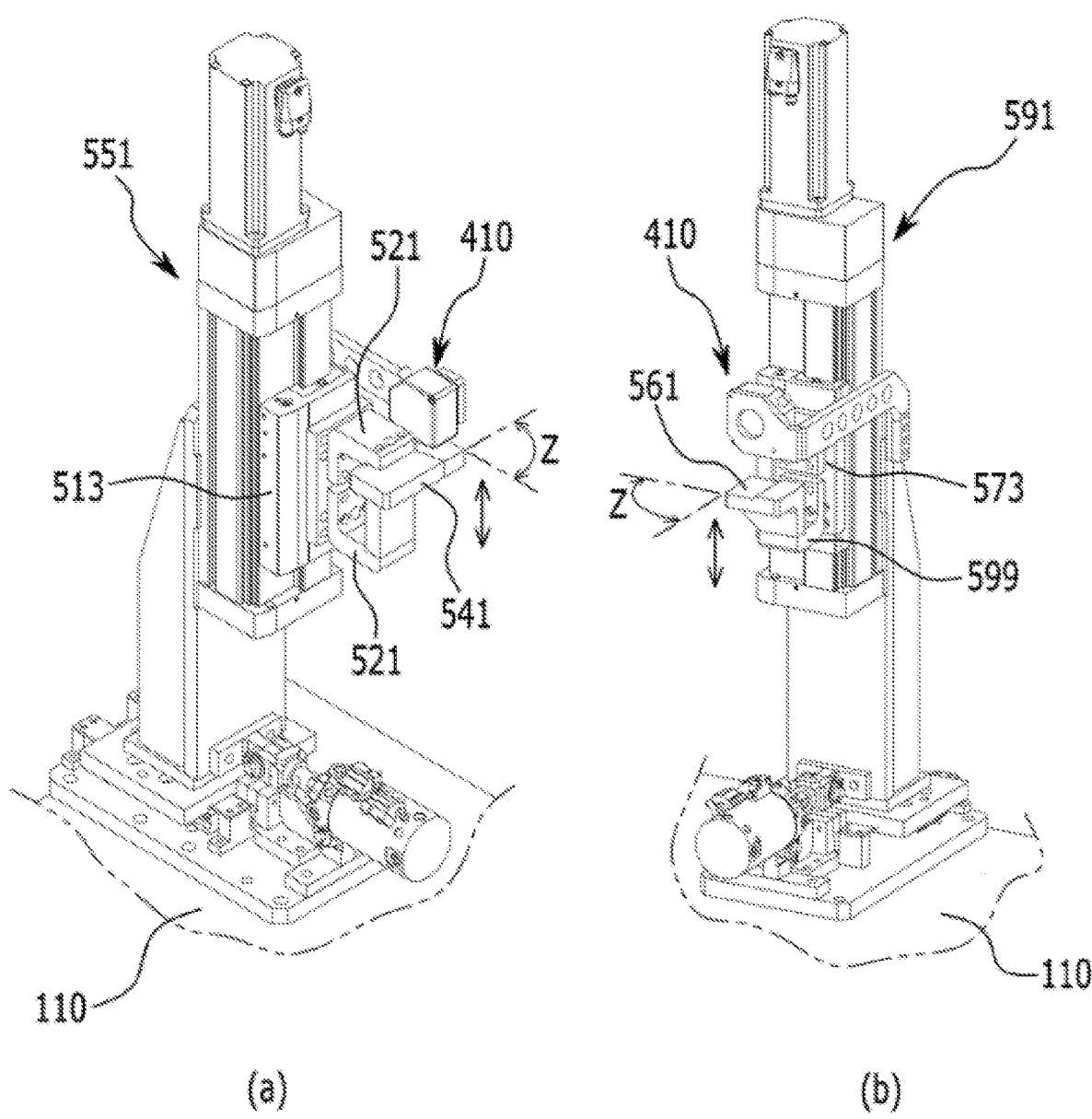
FIG. 10 is an exemplary diagram illustrating an original point setting block mounting state of the correction unit applied to the apparatus of size correction for a hot stamping component according to the exemplary embodiment of the present disclosure.

Further, original point setting blocks 541 and 561 for setting the zero base (original point) of the measurement unit 410 may be detachably installed in the first and second moving blocks 513 and 573 of the correction unit 510 according to the exemplary embodiment of the present disclosure as illustrated in FIG. 10. The original point setting blocks 541 and 561 may be mounted on the first and second mounting brackets 521 and 599 of the first and second moving blocks 513 and 573 while initialing setting the present apparatus 100. The original point setting blocks 541 and 561 may be mounted on the mounting brackets 521 and 599 while the first and second pressing members 515 and 575 are removed from the first and second mounting brackets 521 and 599. Unlike this, the original point setting blocks 541 and 561 may be mounted on the mounting brackets 521 and 599 while the first and second pressing members 515 and 575 are not removed from the first and second mounting brackets 521 and 599.

In the exemplary embodiment of the present disclosure, before setting the hot stamping component 1 in the attaching unit 210, the original point setting blocks 541 and 561 may be mounted on the first and second mounting brackets 521 and 599 of the first and second moving blocks 513 and 573. In addition, in the exemplary embodiment of the present disclosure, when the first and second moving blocks 513 and 573 are configured to move in the vertical direction by the second and fourth driving units 551 and 591, the zero base (e.g., original point) having a predetermined height may be set based on the original point setting blocks 541 and 561 while sensing variations of the original point setting blocks 541 and 561 by the measurement unit 410.

In the exemplary embodiment of the present disclosure, the apparatus 100 may include a check block 150 installed in front of the jig frame 110 as illustrated in FIG. 5. The check block 150 may be disposed at a position corresponding to the zero base mentioned above. The check block 150 may be used for an operator to verify the height size of the quenched component 5 when correction of the quenched component 5 is completed by the correction unit 510. The check block 150 may be used for measuring the height size of the quenched component 5 using a measurement device (e.g., a dial gauge).

Referring to FIG. 1, the controller 610 according to the exemplary embodiment of the present disclosure may be a controller configured to operate the correction apparatus 100. The controller 610 may be implemented by one or more microprocessors (control logic) which operate by a program. The controller 610 may be configured to operate the attaching unit 210 based on a predetermined specification of the hot stamping component 1. In addition, the controller 610 may be configured to detect whether the hot stamping component 1 is seated on the attaching unit 210 by receiving the sensed signal from the sensor 350 and operate the clamping unit 310 and the correction unit 510.

Furthermore, the controller 610 may be configured to compare and analyze the height size of the quenched component 5 measured by the measurement unit 410 and a reference value of a zero base reference to apply a control signal to the correction unit 510. In other words, the controller 610 may be configured to compare the height size of the quenched component 5 measured by the measurement unit 410 and the reference value of the zero base reference and when the controller 610 determines that the height size of the quenched component 5 is less than or equal to or greater than the reference value, the controller 610 may output the control signal to the correction unit 510.

In the exemplary embodiment of the present disclosure, the indicator 710 may indicate overall data based on correcting the quenched component 5 of the hot stamping component 1 by receiving an electric signal from the controller 610. The indicator 710 may be configured to indicate measurement data before and after correcting the height size of the quenched component 5 and whether the size of the quenched component 5 is defective based on the measurement data.

Hereinafter, an operation of the apparatus 100 of size correction for a hot stamping component according to the exemplary embodiment of the present disclosure, which is configured as above and a correction method of the hot stamping component using the correction apparatus 100 will be described in detail with reference to the aforementioned drawings and the accompanying drawings.

Figure 11:
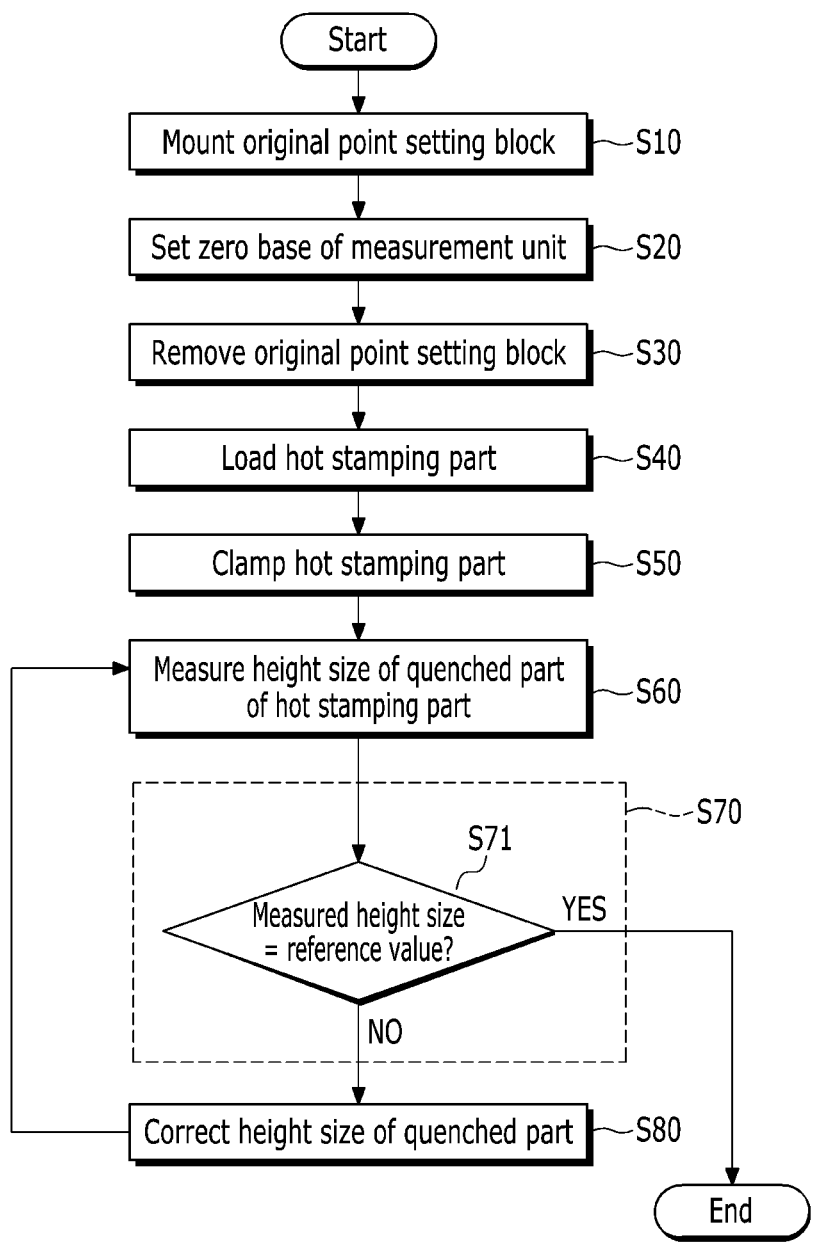
FIG. 11 is an exemplary flowchart for describing a method of size correction for a hot stamping component according to an exemplary embodiment of the present disclosure.

FIG. 11 is an exemplary flowchart for describing a method of size correction for a hot stamping component according to an exemplary embodiment of the present disclosure. Referring to FIG. 11, first, the original setting blocks 541 and 561 may be mounted on the correction unit 510 S10 and the zero base (e.g., original point) of the measurement unit 410 is set S20, in the exemplary embodiment of the present disclosure.

The original point setting blocks 541 and 561 may be mounted on the first and second mounting brackets 521 and 599 of the first and second moving blocks 513 and 573 of the correction unit 510, respectively S10. In particular, the first and second moving brackets 511 and 571 of the correction unit 510 may be configured to move backward in a direction to be distant from the attaching unit 210 by the first and third driving units 531 and 581. When the first and second moving blocks 513 and 573 of the correction unit 510 are configured to move in the vertical direction by the second and fourth driving units 551 and 591, the zero base (original point) having a predetermined height may be set based on the original point setting blocks 541 and 561 while sensing variations of the original point setting blocks 541 and 561 by the measurement unit 410 S20.

While the zero base of the measurement unit 410 is set as described above, the original point setting blocks 541 and 561 may be removed from the first and second mounting brackets 521 and 599 of the first and second moving blocks 513 and 573 in the exemplary embodiment of the present disclosure S30. Then, as illustrated in FIG. 2, the hot stamping component 1 may be provided, which is partitioned and processed into the high-strength portion 3, the quenched component 5, and the transition section 7 and the hot stamping component 1 may be loaded on the attaching units 210 (step S40).

In particular, the hot stamping component 1 may be loaded onto the attaching units 210 in the anteroposterior direction of the jig frame 110 to position the quenched component 5 of the hot stamping component 1 in front of the jig frame 110. For example, each of the first and second pressing members 515 and 575 may be mounted on the first and second mounting brackets 521 and 599 of the first and second moving blocks 513 and 573 of the correction unit 510 at a predetermined gap as one pair. The first attaching block 213 of the attaching unit 210 may be configured to rotate in the anteroposterior direction with respect to the first attaching locator 211 as the operation rod 217 may be configured to move forward and backward by operating the first attaching cylinder 215 and operate a seating position of the hot stamping component 1 of which the shape and the size may vary based on the vehicle type S40.

Additionally, the second attaching block 235 of the attaching unit 210 may be configured to move in the vertical direction with respect to the second attaching locator 231 as the operation rod 237 may be configured to move forward and backward in the vertical direction by operating the second attaching cylinder 233 and control the seating position of the hot stamping component 1 of which the shape and the size may vary based on the vehicle type. In other words, the attaching unit 210 may be configured to determine the reference position of the hot stamping component 1 while inserting the first reference pin 271 of the first attaching block 213 into the reference aperture 9 in front of the hot stamping component 1 in front of the jig frame 110. In addition, the attaching unit 210 may be configured to determine the reference position of the hot stamping component 1 while inserting the first reference pin 273 of the first attaching block 235 into the reference aperture 9 in the rear of the hot stamping component 2 in the rear of the jig frame 110.

Meanwhile, in the exemplary embodiment of the present disclosure, in the course of seating the hot stamping component 1 on the attaching unit 210, seating the hot stamping component 1 may be configured to be sensed using the sensor 350 and the sensed signal may be output to the controller 610. Therefore, the controller 610 may apply an electric control signal to the clamping unit 310 and apply the electric control signal to the clamping units 310 corresponding to the hot stamping component 1, which are different for each vehicle type. Then, the clamping unit 310 may be configured to operate the clamping cylinder 315 and clamp the top and the edge of the hot stamping component 1 by the clamper 313 S50.

Further, in the exemplary embodiment of the present disclosure, when the hot stamping component 1 is clamped by the clamping unit 310, the first and second moving brackets 511 and 571 of the correction unit 510 may be configured to move forward to the attaching unit 210 by the first and third driving units 531 and 581. In particular, the center 6a of the quenched component 5 of the hot stamping component 1 may be positioned between a pair of first pressing members 515 and both sides 6b and 6c of the quenched component 5 may be positioned between a pair of second pressing members 575.

In the exemplary embodiment of the present disclosure, the height sizes of the center 6a and both sides 6b and 6c of the quenched component 5 may be measured by the variation sensor 413 of the measurement unit 410 based on a predetermined zero base and measurement values may be output to the controller 610 (step S60). Then, the controller 610 may be configured to compare and analyze the height sizes of the center 6a and both sides 6b and 6c of the quenched component 5, which are measured by the measurement unit 410 and a reference value (e.g., a predetermined reference height determined by vehicle type and model) of the zero base reference to control the correct unit 510 S70.

Figure 12:
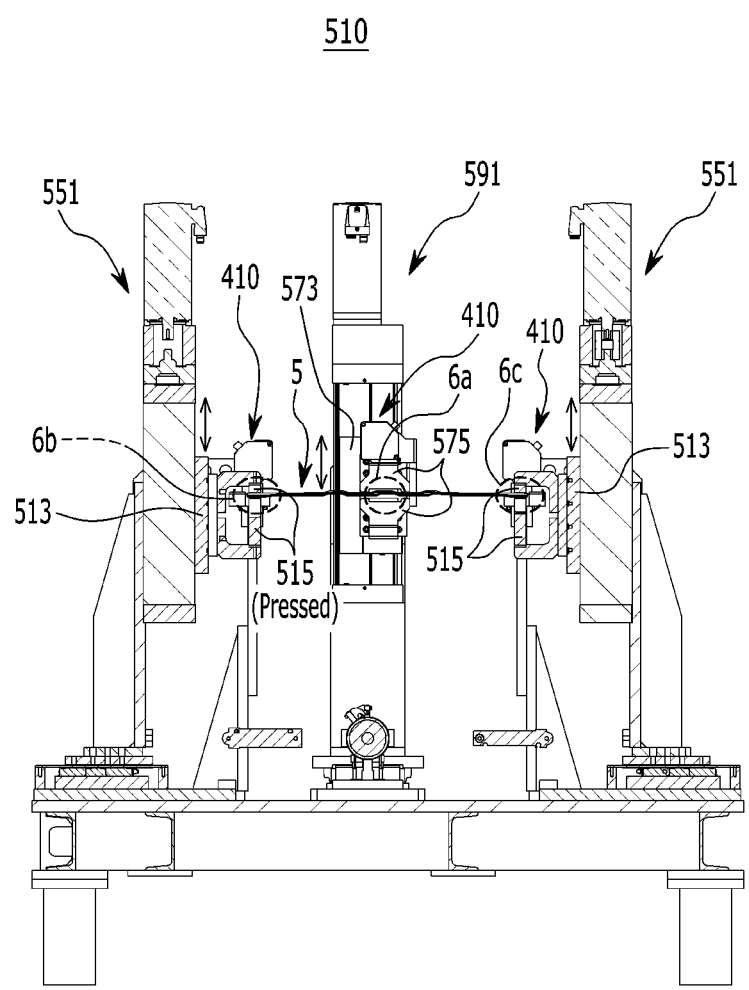
FIG. 12 is an exemplary diagram illustrating a process for correcting a quenched component of a correction unit in the method of size correction for a hot stamping component according to the exemplary embodiment of the present disclosure.

Therefore, the correction unit 510 may be configured to apply a force (e.g., press) to the center 6a and the both sides 6b and 6c in the vertical direction based on the reference value according to the height sizes of the center 6a and the both sides 6b and 6c of the quenched component 5 and may be configured to adjust the height sizes of the center 6a and the both sides 6b and 6c S80. When steps S70 and S80 are described in detail with reference to FIGS. 11 and 12, the height sizes of the center 6a and the both sides 6b and 6c of the quenched component 5, measured by the measurement unit 410 may be compared with the reference value to determine whether the height sizes meet the reference value in the exemplary embodiment of the present disclosure S71. In particular, when the height sizes meet the reference value, the process ends without separate correction of the quenched component 5.

Further, in response to determining that the height size of any one of the both sides 6b and 6c of the quenched component 5 is less than the reference value, the first moving block 213 may be configured to move in a downward direction by the second driving unit 551 with a predetermined variation in the exemplary embodiment of the present disclosure. Then, the first pressing member 515 may correct the height sizes of the both sides 6b and 6c while pressing the tops of the sides 6b and 6c. In addition, when it is determined that the height size of any one of the both sides 6b and 6c of the quenched component 5 is equal to or greater than the reference value, the first moving block 513 may be configured to move in an upward direction through the second driving unit 551 with a predetermined variation in the exemplary embodiment of the present disclosure. Then, the first pressing member 515 may correct the height sizes of the both sides 6b and 6c while applying a force to the bottoms of the sides 6b and 6c.

In response to determining that the height size of the center 6a of the quenched component 5 is less than the reference value, the second moving block 573 may be configured to move in a downward direction by the fourth driving unit 591 with a predetermined variation in the exemplary embodiment of the present disclosure. Then, the second pressing member 575 may correct the height size of the center 6a while applying a force to the top of the center 6a. In addition, in response to determining that the height size of the center 6a of the quenched component 5 is equal to or greater than the reference value, the second moving block 573 may be configured to move in an upward direction by the fourth driving unit 591 with a predetermined variation in the exemplary embodiment of the present disclosure. Then, the second pressing member 575 may correct the height size of the center 6a while applying a force to the bottom of the center 6a.

The correction unit 510 may be configured to correct the center 6a according to the height sizes of each center 6a and the both sides 6b and 6c of the quenched component 5, correct any one side 6b or the other side 6c, and correct the both sides 6b and 6c. Further, the correction unit 510 may be configured to correct the center 6a and any one side 6b, correct the center 6a and the other side 6c, and simultaneously correct the center 6a and the both sides 6b and 6c. In particular, in the exemplary embodiment of the present disclosure, the height size of the quenched component 5 may be continuously measured through the measurement unit 410, the measurement value may be output to the controller 610, and the aforementioned process may be repeated. In addition, measurement data before and after correcting the height size of the quenched component 5 and whether the size of the quenched component 5 is defective based on the measurement data may be indicated by the indicator 710. When the correction of the quenched component 5 is terminated, the height size of the quenched component 5 may be measured by using the measurement device (e.g., the dial gauge) and the height size of the quenched component 5 may be dually checked, based on the check block 150 in the exemplary embodiment of the present disclosure.

In the apparatus 100 and the method of size correction for the hot stamping component according to the exemplary embodiment of the present disclosure, the size distribution may be corrected, which is generated due to twisting of the quenched component 5 while a heated portion of the blank is slowly cooled at a room temperature in a hot stamping molding process. Accordingly, in the exemplary embodiments, the height size of the quenched component 5 may be measured in the hot stamping component 1 and since the size of the quenched component 5 may be corrected to a height size range set according to the height size, the size distribution of the quenched component 5 for the hot stamping component 1 may be reduced. As a result, in the exemplary embodiments, a flatness distribution of a door hinge surface may be minimized in a side complete assembly to reduce a poor inter-door step quality and achieve cost reduction based on a decrease in the defect rate.

Furthermore, in the exemplary embodiment, since the size of the quenched component 5 may be measured by the check block 150 and the size of the quenched component 5 may be dually checked in addition to correction of the quenched component 5 by the correction unit 510, size precision of the quenched component 5 may be further improved.

Although the exemplary embodiments of the present disclosure have been described as above, the technical spirit of the present disclosure is not limited to the exemplary embodiments presented in the present specification and those skilled in the art, who appreciate the technical spirit of the present disclosure will be able to easily propose other exemplary embodiments by addition, modification, deletion, annexation, and the like of components within the same scope of the technical spirit, but this is also included in the claims of the present disclosure.

What is claimed is:

1. An apparatus of size correction for a hot stamping component, comprising:
    a jig frame;
    a plurality of attaching units disposed on the jig frame, configured to rotate in an anteroposterior direction and support a hot stamping component having a quenched component partially quenched along the jig frame in the anteroposterior direction;
    a plurality of clamping units disposed on the jig frame and configured to clamp the hot stamping component;
    a plurality of measurement units mounted on the jig frame and configured to measure a height size of the quenched component based on a predetermined zero base; and
    a plurality of correction units disposed in front of the jig frame to correspond to the quenched component of the hot stamping component, configured to apply a force to the quenched component in a vertical direction based on the height size of the quenched component, measured by the measurement unit, and correct the height size of the quenched component,
    wherein the plurality of attaching units includes:
        a first attaching locator disposed in the jig frame in the anteroposterior direction and positioned to be erected in the vertical direction, wherein a first attaching block hinge-coupled to the first attaching locator configured to be rotatable in the anteroposterior direction and supporting the hot stamping component; and wherein a first attaching cylinder hinge-coupled to the first attaching locator and having a front end of an operation rod hinge-coupled to the first attaching block, and
    wherein in the first attaching block positioned in front of the jig frame, a first reference pin inserted into the hot stamping component and determines a reference position of the installed hot stamping component.

2. The apparatus of claim 1, wherein the plurality of correction units are configured to correct the height sizes of a center and both sides of the quenched component.

3. An apparatus of size correction for a hot stamping component, comprising:
    a jig frame;
    a plurality of attaching units disposed on the jig frame, configured to rotate in an anteroposterior direction and support a hot stamping component having a quenched component partially quenched along the jig frame in the anteroposterior direction;
    a plurality of clamping units disposed on the jig frame and configured to clamp the hot stamping component;
    a plurality of measurement units mounted on the jig frame and configured to measure a height size of the quenched component based on a predetermined zero base; and
    a plurality of correction units disposed in front of the jig frame to correspond to the quenched component of the hot stamping component, configured to apply a force to the quenched component in a vertical direction based on the height size of the quenched component, measured by the measurement unit, and correct the height size of the quenched component,
    wherein the plurality of attaching units includes:
        a first attaching locator disposed in the jig frame in the anteroposterior direction and positioned to be erected in the vertical direction, wherein a first attaching block hinge-coupled to the first attaching locator configured to be rotatable in the anteroposterior direction and supporting the hot stamping component; and wherein a first attaching cylinder hinge-coupled to the first attaching locator and having a front end of an operation rod hinge-coupled to the first attaching block
    wherein the plurality of attaching units includes: a pair of second attaching locators disposed to be erected in the vertical direction in the rear of the jig frame; a second attaching cylinder disposed in each of the second attaching locator, and a second attaching block is coupled to the front end of the operation rod of the second attaching cylinder, and
    wherein in the second attaching block, a reference pin is inserted into the hot stamping component and determines the reference position of the installed hot stamping component.

4. The apparatus of claim 3, wherein attaching pads are disposed in the first and second attaching blocks.

5. The apparatus of claim 1, wherein each of the clamping units include: a clamping locator disposed in the jig frame in the anteroposterior direction and disposed to be erected in the vertical direction;
    a clamper rotatably hinge-coupled to the clamping locator; and
    a clamping cylinder hinge-coupled to the clamping locator and having a front end of an operation rod hinge-coupled to the clamper.

6. An apparatus of size correction for a hot stamping component, comprising:
    a jig frame;
    a plurality of attaching units disposed on the jig frame, configured to rotate in an anteroposterior direction and support a hot stamping component having a quenched component partially quenched along the jig frame in the anteroposterior direction;

a plurality of clamping units disposed on the jig frame and configured to clamp the hot stamping component;

a plurality of measurement units mounted on the jig frame and configured to measure a height size of the quenched component based on a predetermined zero base; and a plurality of correction units disposed in front of the jig frame to correspond to the quenched component of the hot stamping component, configured to apply a force to the quenched component in a vertical direction based on the height size of the quenched component, measured by the measurement unit, and correct the height size of the quenched component, wherein each of the correction units include: a first moving bracket configured to be adjusted in a horizontal direction in front of the jig frame through a first driving unit to correspond to both sides of the quenched component, a first moving block installed in the first moving bracket configured to be adjusted in the vertical direction through a second driving unit, and a pair of first pressing members fixed to the first moving block with a predetermined gap and configured to apply a force to both sides of the quenched component in the vertical direction wherein each of the correction units include:
a second moving bracket configured to be adjusted in the anteroposterior direction through a third driving unit in front of the jig frame to correspond to the center of the quenched component;

a second moving block installed in the second moving bracket configured to be adjusted the vertical direction through a fourth driving unit; and a pair of second pressing members fixed to the second moving block with a predetermined gap and configured to apply a force to the center of the quenched component in the vertical direction.

7. The apparatus of claim 6, wherein in the first and second moving blocks, an original point setting block is configured to determine the zero base of the measurement unit is detachably installed.

8. The apparatus of claim 6, wherein any one of the one pair of first pressing members is provided in a right angle shape and configured to apply a force to the tops of the sides of the quenched component, and the other one of the one pair of first pressing member is provided in an L shape and configured to apply force to the bottoms of the sides of the quenched component.

9. The apparatus of claim 6, wherein the one pair of second pressing members, are provided in a trapezoidal shape in which a long side contacts the top and the bottom and configured to apply a force to the top and the bottom of the center of the quenched component.

10. The apparatus of claim 6, wherein each of the measurement units include a variation sensor fixedly installed in the first and second moving brackets via a fixation bracket and configured to sense a height variation of the quenched component.

11. The apparatus of claim 1, wherein in front of the jig frame a check block is installed at a position that corresponds to the zero base.

12. A method of size correction for a hot stamping component using the apparatus of size correction for a hot stamping component of claim 1, which corrects the size of a quenched component of the hot stamping component, the method comprising: mounting an original point setting block on a correction unit of the plurality of correction units and setting the predetermined zero base of a measurement unit of the plurality of measurement units; removing the original point setting block from the correction unit, loading a hot stamping component to an attaching unit of the plurality of attaching unit on the jig frame, and clamping the hot stamping component through a clamping unit of the plurality of clamping units; measuring a height size of the quenched component by the measurement unit based on the zero base; and operating the correction unit by comparing and analyzing the height size of the quenched component, measured by the measurement unit and a reference value of the zero base reference.

13. The method of claim 12, wherein in operating the correction unit, the height size of the quenched component, which is measured by the measurement unit is compared with the reference value of the zero base reference and wherein when the height size of the quenched component is less than or equal to or greater than the reference value, the quenched component is pressed upward or downward by applying a control signal to the correction unit.

14. The method of claim 13, wherein measuring the height size of the quenched component is repeated after operating the correction unit by comparing and analyzing the height size of the quenched part.

15. The method of claim 13, wherein the height sizes of a center and both sides of the quenched component are adjusted by the correction unit.

16. The method of claim 12, wherein measurement data before and after correcting the height size of the quenched component and whether the size of the quenched component based on the measurement data is defective are indicated by an indicator.

17. The method of claim 12, wherein the height size of the quenched component is measured by a dial gauge.

* * * * *